Aug. 15, 1972
R. B. REINHALL
3,684,651
DIGESTION OF FIBRE PULP FROM VEGETABLE RAW MATERIAL INCLUDING PULP LEVEL CONTROLS
Filed Jan. 23, 1970
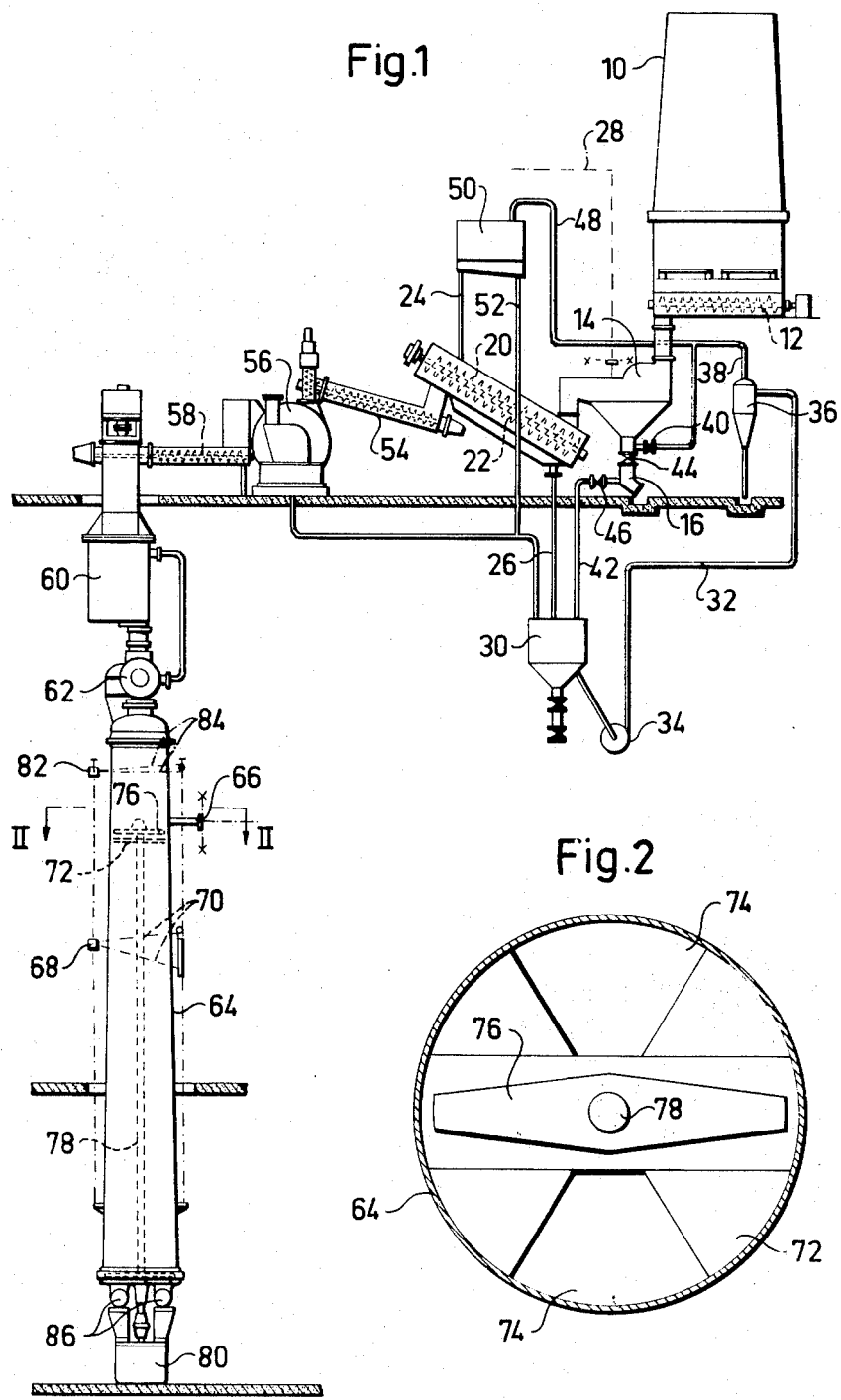
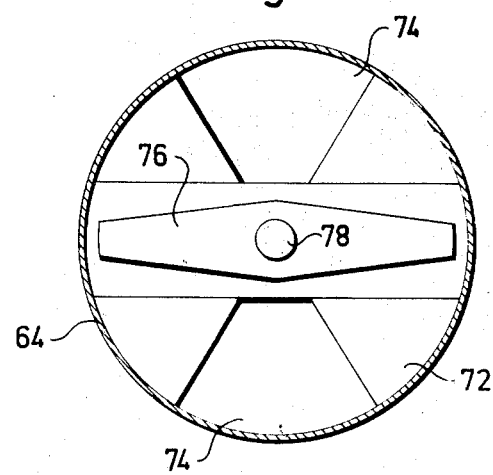
INVENTOR:
Rolf Bertil Reinhall
By Munson & Fiddler
Attorneys

United States Patent Office 3,684,651
Patented Aug. 15, 1972

3,684,651
DIGESTION OF FIBRE PULP FROM VEGETABLE RAW MATERIAL INCLUDING PULP LEVEL CONTROLS
Rolf Bertil Reinhall, Killingevagen 16, Lidingo, Sweden
Filed Jan. 23, 1970, Ser. No. 5,239
Claims priority, application Sweden, Feb. 17, 1969, 2,181/69
Int. Cl. D21c 3/26, 7/12, 9/06
U.S. Cl. 162—19
4 Claims

ABSTRACT OF THE DISCLOSURE

Method and apparatus for producing pulp from finely comminuted material such as sawdust from which coarse and other nondesirable particulate matter is washed out in a flotation device through which an aqueous chemical solution is circulated in contact with the pulp material, the thus impregnated pulp being subsequently dewatered to a solid content ranging between 30% to 50% and followed by treatment with steam in a digester through which the pulp is passed by gravity and having a controller for maintaining the pulp at a predetermined level above the outlet of the digester and a second controller for maintaining a layer of the pulp at a controlled level above the steam inlet to the digester, the passage of the pulp being arrested adjacent the steam inlet for a predetermined period of time and above the predetermined level of the digested pulp.

---

This invention relates to a method in production of fiber pulp from vegetable raw material.

More particularly this invention relates to a method in production of fiber pulp from vegetable raw material in the form of saw dust and similar particles, comprising the steps of washing of the raw material for removal of foreign particles, dewatering and subsequent digestion in vapour phase of the material in the presence of chemicals.

One main object of the invention is to provide a simplification of the manufacture while the raw material at the same time is thoroughly impregnated without having to be subjected to heavier mechanical action. According to one main feature of the invention the washing is effected by means of a solution in which the chemicals are contained so that the material simultaneously with the washing is impregnated with said chemicals. In order that the raw material becomes thoroughly impregnated it must during the washing be present in a relatively finely divided state. The invention is thus specifically applicable to materials with smaller particle size than conventional chips such as saw dust or chopped grass, straw, bagasse or the like. It has proved to be possible to combine the washing with an impregnation with chemicals in well determined quantities while at the same time maintaining the quantity of water following with the digestion at a low value which results in good economy.

Further objects and advantages of the invention will become apparent from the following description, considered in connection with the accompanying drawing, which forms part of this specification and of which:

FIG. 1 is a lateral projection of an apparatus constructed for carrying out the method.

FIG. 2 is a sectional view in a larger scale following the line II—II of FIG. 1.

Referring now to the drawing, reference numeral 10 denotes a bin, into which the raw material, such as saw dust, is introduced to be fed therefrom by a conveyor 12 into a so-called scrap separator 14 for separation of solid heavier particles accompanying the material, such as gravel, sand, metallic objects and similar impurities. According to the invention, the separator 14 is filled with an aqueous solution of chemicals of a kind known per se which are used in the subsequent cooking or digestion in steam phase of the material. In the separator 14, the solution of chemicals, such as white liquor, for example, is subjected to a turbulent movement, whereby the foreign particles are caused by their weight to sink down into a tube 16 while the lighter saw dust at the top is floated via an overflow 18 to a dewaterer 20. This latter is provided with a screw 22, which conveys the saw dust upwardly in which movement it can be supplied from above with liquid such as a solution of chemicals, through a pipe 24. During the upward movement of the saw dust within the dewaterer 20 by the screw conveyor 22, residual finer impurities, such as sand, are separated off and escape at the bottom through a conduit 26.

A separator 14 combined with a dewaterer 20 for removal of impurities accompanying cellulose containing raw material is described in the U.S. Pat. No. 3,279,597 to which reference is made for a more detailed description thereof. In accordance with the invention, the washing and dewatering step is combined with an impregnation of the finely divided raw material, such as the saw dust, for the subsequent cooking or digestion step. Fresh chemical solution or digestion liquid is supplied to the separator 14 from a storage vessel not shown through a pipe 28 so that the separator always to its major portion is filled with liquid. This is caused to circulate between the scrap separator 14 and a container 30 within which the foreign particles separated from the saw dust are collected. Simultaneously, liquid flows through the pipe 26 to the container 30 and thence through a conduit 32 by means of a pump 34 to a hydrocyclone 36 and therefrom through a conduit 38 and by means of a valve 40, back to the lower portion of the separator 14 where the liquid then continues to impart a turbulent movement to the content in the separator. The separated material collected in the outlet 16 can intermittently be discharged through a conduit 42 into the container 30 by adjustment of valves 44 and 46, respectively. In the cyclone 36, a separation of the finest non-desired particles is effected. A conduit 48 extends from the cyclone 36 and the pump conduit 38 to a drum screen 50 within which saw dust particles carried along by the liquid are separated. Extending from said screen are the above mentioned conduit 24 as well as a suitable further conduit 52 which is in connection with the container 30.

In the liquid present in the scrap separator 14, the saw dust constitutes a minor portion such as 5%, only. Due to the fact that the saw dust constitutes relatively small particles, the digestion liquor is capable of penetrating to the interior parts thereof so that good impregnation is ensured. Behind the dewatered the share of the saw dust has increased to e.g. 15–20% when it is further advanced by a screw conveyor 54 to a mechanical press 56 preferably of the Davenport type as is shown in U.S. Pat. No. 3,053,171, for example. The dry content of the pulp leaving the dewaterer is namely too low to permit the subsequent digestion process to be conducted in an economically favourable manner. The saw dust is additionally dewatered in the press 56 so that the pulp suspension attains a dry content exceeding 30%, such as up to 40 to 50%, whereupon it is advanced by the screw conveyor 58 to a equalization bin 60 and therefrom through a rotating feeder 62 into a digester 64. In the digester 64, a digestion is effected in steam atmosphere, the steam being introduced through one or several conduits 66 with a pressure of e.g. 6–10 kgs./cm.$^2$ and at a corresponding temperature.

Within the digester 64 a level of the saw dust between the limits 70 is maintained by means of a controller means 68. At some distance above said level, a partition bottom 72 formed with openings 74 has been inserted and over said bottom a scraper member 76 adapted to be driven by a central vertical shaft 78 is provided. This shaft extends downwards through a digester to a driving motor 80 mounted below the digester. The steam inlet 66 is suitably located immediately above the intermediate bottom 72. By this arrangement thorough heating of the saw dust particles is ensured before they fall down to the main quantity of material located in the lower portion of the digester. By means of a controller 82, a thin layer of saw dust can be maintained between the limits 84 above the partition bottom 72. This minor quantity thus is initially preheated by steam to the predetermined temperature before it is conveyed downwards through the holes 74 of the partition bottom by the scraper 76. The partition bottom 72 further assists in avoiding the so-called "channelling" in the vertical digester which channelling might result in free liquid flowing down within the channels thus formed and, in addition, a non-uniform discharge from the digester with a consequent non-uniform digestion would be produced. A plurality of intermediate bottoms 72 with scraping members cooperating therewith may be provided at various levels in the digester.

After the digestion, the pulp is discharged by means of discharge members 86 for further treatment, such as a grinding in a defibrator or a refiner.

While one more or less specific embodiment of the invention has been shown and described it is to be understood that this is for purpose of illustration only, and that the invention is not to be limited thereby, but its scope is to be determined by the appended claims.

What is claimed is:

1. Method of producing pulp from finely comminuted material comprising:
   (a) washing the material in a floatation device with an aqueous chemical solution to impregnate said material;
   (b) removing non-desirable particulate material from the floatation device;
   (c) removing excess liquid from the impregnated pulp material to produce a pulp material having a solid content ranging between 30% to 50%;
   (d) passing the resultant pulp by gravity through a digester having a steam inlet;
   (e) maintaining a layer of material at a controlled level above the steam inlet, and
   (f) arresting the passage of the pulp material adjacent the steam inlet for exposure to steam for a predetermined period of time.

2. Apparatus for producing pulp from finely comminuted material comprising:
   (a) a floatation device for receiving the material and for removing therefrom reject particulate material;
   (b) means connected to said floatation device for passing an aqueous chemical solution through said floatation device in intimate contact with the pulp material;
   (c) means connected to said floatation device for passing reject material from said floatation device;
   (d) dewatering means connected to said floatation device for receiving the impregnated pulp material and to remove therefrom liquid to produce pulp material having a predetermined solid content;
   (e) a digester connected to said dewatering means having a steam inlet through which the dewatered pulp is passed by gravity;
   (f) means connected to the digester for controlling the level of the pulp at a predetermined level above the outlet of the digester;
   (g) means above said level connected to the steam inlet for arresting the passage of the pulp through the digester for a predetermined period of time, and
   (h) controlled means connected to the digester for maintaining a layer of the pulp material above the steam inlet of the digester.

3. Apparatus according to claim 2, in which the arrester means includes a perforate plate, and a scraper adapted to rotate about the surface of the perforate plate.

4. Apparatus according to claim 2, in which the passage means for the aqueous chemical solution includes a screen separator, and means for passing the screened pulp material entrained in the chemical solution to said dewatering means.

References Cited

UNITED STATES PATENTS

| | | | |
|---|---|---|---|
| 3,367,495 | 2/1968 | Lea et al. | 162—55 X |
| 2,662,821 | 12/1953 | Muench | 162—237 |
| 2,029,973 | 2/1936 | Wells | 162—55 |
| 2,862,814 | 12/1958 | Birdseye | 162—17 |
| 2,870,009 | 1/1959 | Richter | 162—19 |

S. LEON BASHORE, Primary Examiner

A. D'ANDREA, JR., Assistant Examiner

U.S. Cl. X.R.

162—49, 52, 55, 60, 237, 246